(12) United States Patent
Luo

(10) Patent No.: US 10,187,459 B2
(45) Date of Patent: Jan. 22, 2019

(54) DISTRIBUTED LOAD BALANCING SYSTEM, HEALTH CHECK METHOD, AND SERVICE NODE

(71) Applicant: HUAWEI TECHNOLOGIES CO., LTD., Shenzhen, Guangdong (CN)

(72) Inventor: Gaowei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/783,519

(22) Filed: Oct. 13, 2017

(65) Prior Publication Data

US 2018/0167453 A1 Jun. 14, 2018

Related U.S. Application Data

(63) Continuation of application No. PCT/CN2016/109859, filed on Dec. 14, 2016.

(51) Int. Cl.
*G06F 15/173* (2006.01)
*H04L 29/08* (2006.01)
*H04L 12/46* (2006.01)
*H04L 12/24* (2006.01)

(52) U.S. Cl.
CPC ...... *H04L 67/1008* (2013.01); *H04L 12/4641* (2013.01); *H04L 41/5058* (2013.01); *H04L 67/1002* (2013.01); *H04L 67/1029* (2013.01); *H04L 41/5096* (2013.01)

(58) Field of Classification Search
CPC .................. H04L 67/1008; H04L 12/4641
See application file for complete search history.

(56) References Cited

U.S. PATENT DOCUMENTS

| 9,106,482 | B1 | 8/2015 | Bapat et al. |
| 2010/0223364 | A1 | 9/2010 | Wei |
| 2010/0251329 | A1 | 9/2010 | Wei |
| 2011/0138052 | A1 | 6/2011 | Caplan et al. |
| 2012/0271964 | A1 | 10/2012 | Porter et al. |

(Continued)

FOREIGN PATENT DOCUMENTS

| CN | 102439913 A | 5/2012 |
| CN | 104780115 A | 7/2015 |
| CN | 105357320 A | 2/2016 |

OTHER PUBLICATIONS

Parveen Patel et al., "Ananta: Cloud Scale Load Balancing," Sigcomm'13, pp. 207-18, Aug. 12-16, 2013, total 12 pages.

(Continued)

*Primary Examiner* — Normin Abedin
(74) *Attorney, Agent, or Firm* — Kilpatrick Townsend & Stockton LLP

(57) ABSTRACT

A distributed load balancing system includes a cloud management platform, an access node, and at least one service node, where the access node and the at least one service node are physical servers, a first virtual load balancer runs on the access node, and at least one backend server runs on the service node. A detection message is sent by using a detection module on a target service node to detect a status of a target backend server, and the status of the target backend server is shared to a first virtual load balancer by using the detection module. Therefore, not only a quantity of detection messages in the load balancing system is reduced, but also signaling load on the access node is reduced.

14 Claims, 8 Drawing Sheets

(56) References Cited

U.S. PATENT DOCUMENTS

2015/0215388 A1 7/2015 Kontothanassis et al.

OTHER PUBLICATIONS

Javier Povedano-Molina et al., "DARGOS: A highly adaptable and scalable monitoring architecture for multi-tenant Clouds", Future Generation Computer Systems 29 (2013) pp. 2041-2056, total 17 pages.
"SDN based Distributed Virtual Router for OpenStack Neutron" https://git.openstack.org/cgit/openstack/dragonflow/tree/doc/source/specs/distributed_load_balancer.rst?h=refs/changes/97/397997/1, 3 pages. Generated Sep. 20, 2017.

DISTRIBUTED LOAD BALANCING SYSTEM, HEALTH CHECK METHOD, AND SERVICE NODE

CROSS-REFERENCE TO RELATED APPLICATIONS

This application is a continuation of International Application No. PCT/CN2016/109859, filed on Dec. 14, 2016, the disclosure of which is hereby incorporated by reference in its entirety.

TECHNICAL FIELD

The present invention relates to the field of cloud network technologies, and in particular, to a distributed load balancing system, a health check method, and a service node.

BACKGROUND

A distributed load balancing system includes multiple service nodes and multiple access nodes. A virtual load balancer and a client run on each access node, and at least one backend server runs on each service node. The client is configured to send a request for accessing a specific service. The virtual load balancer is configured to obtain a status of each target backend server of multiple target backend servers providing the service, and select a target backend server for the request according to a load balancing policy and the status of each target backend server. The selected target backend server is configured to process the request.

Currently, when obtaining the status of each target backend server of the multiple target backend servers providing the service, the virtual load balancer separately obtains an Internet Protocol (Internet Protocol, IP) address of each target backend server. By using an IP address of the virtual load balancer as a source IP address and using the IP address of each target backend server as a destination IP address, the virtual load balancer sends a detection message to each target backend server, records a status of a target backend server returning a response as normal, and records a status of a target backend server returning no response or returning a response upon overtime as abnormal.

The distributed load balancing system includes a large quantity of access nodes and service nodes, and the virtual load balancer on each access node needs to send a detection message to obtain a status of each target backend server. Consequently, a large quantity of detection messages exist in the distributed load balancing system. The large quantity of detection messages not only affect another service in the distributed load balancing system, but also increase signaling load on the access node.

SUMMARY

Embodiments of the present invention provide a distributed load balancing system, a health check method, and a service node, so as to resolve a problem in the prior art. Technical solutions are as follows.

According to a first aspect, an embodiment of the present invention provides a distributed load balancing system, including a cloud management platform, an access node, and at least one service node, where the access node and the at least one service node are physical servers, a first virtual load balancer runs on the access node, and at least one backend server runs on the service node, where the cloud management platform determines multiple target backend servers providing a service, and an identifier of each target service node on which the multiple target backend servers are located, and sends a check request message to each target service node. Each target service node sends a detection message to the target backend server by using a detection module, detects a status of the target backend server that provides the service and that is located on the target service node, and shares the status of the target backend server to the first virtual load balancer on the access node by using the detection module, so that the first virtual load balancer updates a recorded status of the backend server providing the service. The detection message may be sent by using the detection module on the target service node to obtain the status of the target backend server, and the status of the target backend server may be shared to the first virtual load balancer by using the detection module. Therefore, not only a quantity of detection messages in the load balancing system is reduced, but also signaling load on the access node is reduced.

In a possible design, the detecting a status of the target backend server, and sharing the status of the target backend server to the first virtual load balancer on the access node specifically includes: after sending the detection message to a target backend server that provides the service and that is located on the node on which the detection module is located, the detection module obtains a detection result, and shares the detection result to the first virtual load balancer, and the first virtual load balancer determines and updates the status of the target backend server according to the detection result. In an example, the detection result may be no response, responding duration, response timeout, connection interruption, or the like. The detection module reports the detection result to the first virtual load balancer, and the first virtual load balancer determines the status of the target backend server according to the detection result. For example, when the detection result of the target backend server is no response, response timeout, or connection interruption, the first virtual load balancer determines that the status of the target backend server is abnormal; when the detection result of the target backend server is responding duration, and the responding duration is not greater than first preset duration, the first virtual load balancer determines that the status of the target backend server is normal; or when the detection result of the target backend server is responding duration, and the responding duration is greater than first preset duration, the first virtual load balancer determines that the status of the target backend server is abnormal. The detection module may share the status of the target backend server to the first virtual load balancer in the foregoing detection result sharing manner. It may be understood by a person skilled in the art that the detection module may also determine the status of the target backend server according to the detection result, and directly share the status of the target backend server to the first virtual load balancer.

In a possible design, the detection module on each target service node is deployed in a first namespace on the target service node, and the first virtual load balancer is deployed in a second namespace on the access node, where the first namespace and the second namespace have a same virtual Internet Protocol IP address.

In this embodiment of the present invention, a virtual IP address of the first namespace and a virtual IP address of the second namespace are set to a same virtual IP address, thereby reducing IP address resources.

In a possible design, the detection module is specifically configured to construct a notification packet, and send the notification packet to the first virtual load balancer, where a source IP address of the notification packet is the virtual IP address, a destination IP address of the notification packet is a subnet broadcast address corresponding to the virtual IP address, and the notification packet carries the status of the target backend server running on the target service node on which the detection module is located.

In this embodiment of the present invention, the destination IP address of the notification packet is the subnet broadcast address corresponding to the virtual IP address. In this case, all first virtual load balancers in a local area network corresponding to the virtual IP address can receive the notification packet, thereby improving efficiency of sharing the status of the target backend server.

In a possible design, namespaces corresponding to different services have different VLAN identifiers, where a VLAN identifier of the first namespace and a VLAN identifier of the second namespace are the same; or the detection module is further specifically configured to send the notification packet to the first virtual load balancer through a tunnel between the access node and each target service node.

In this embodiment of the present invention, VLAN identifiers of the first namespace and the second namespace that are corresponding to a same service may be set to a same VLAN identifier, thereby implementing network separation for different services, ensuring that the notification packet sent by the detection module is received only by the first virtual load balancers in the same virtual local area network, and improving accuracy of sending the notification packet by the detection module. Alternatively, the detection module may further send the notification packet through the tunnel established between the access node and the target service node, thereby improving flexibility of sending the notification packet by the detection module.

In a possible design, when a client accessing the service runs on a target service node, the target service node further includes a second virtual load balancer; and the detection module on the target service node is further configured to send the status of the target backend server on the target service node to the second virtual load balancer.

In this embodiment of the present invention, if the client accessing the service runs on the target service node, the second virtual load balancer may be deployed in the target service node. The detection module may further send the status of the target backend server to the second virtual load balancer, thereby improving applicability of the distributed load balancing system.

In a possible design, the cloud management platform records a correspondence among the identifier of the service, a network address of each backend server running the service, and an identifier of a service node on which the backend server is located.

In this embodiment of the present invention, the cloud management platform records the correspondence among the identifier of the service, a network address of each backend server running the service, and an identifier of a service node on which the backend server is located, so that the cloud management platform may accurately learn a service node and a backend server that are corresponding to each service, and a backend server that is corresponding to each service node and that provides the service. This improves accuracy of obtaining the status of the target backend server in the distributed load balancing system.

In a possible design, the first virtual load balancer is further configured to receive a request that is for accessing the service and that is sent by the client, and select, for the client according to the updated status of the backend server, a backend server providing the service.

In this embodiment of the present invention, after receiving the request that is for accessing the service and that is sent by the client, the first virtual load balancer selects, for the client according to the updated status of the backend server, the backend server providing the service. The updated status of the backend server is a latest status of the backend server that can currently provide the service. This improves accuracy of selecting the backend server by the first virtual load balancer for the client.

In a possible design, that the detection module may determine the status of the target backend server according to the detection result specifically includes: each detection module is further configured to record a status of a target backend server returning a response as normal, and record a status of a target backend server returning no response or returning a response upon overtime as abnormal. After determining the status of the target backend server, the detection module may directly share the status of the target backend server to the first virtual load balancer.

In this embodiment of the present invention, after sending the detection message to the target backend server, the detection module determines the status of the target backend server according to a time of returning a response by the target backend server, thereby further improving accuracy of determining the status of the target backend server by the detection module.

In a possible design, the backend server runs on a virtual machine or in a container on the service node. Therefore, the network address of the backend server is an address of the virtual machine or the container on/in which the backend server runs.

In a possible design, the network address of the backend server includes the virtual IP address and a port number.

According to a second aspect, an embodiment of the present invention provides a health check method in a distributed load balancing system, including:

determining, by a cloud management platform according to an identifier of a service, multiple target backend servers providing the service, and a network address of each target backend server of the multiple target backend servers; determining an identifier of each target service node on which the multiple target backend servers are located; and sending a check request message to each target service node, where each check request message carries a network address of the target backend server running on the target service node that receives the check request message, and the identifier of the service;

receiving, by each target service node, the check request message, and sending the network address of the target backend server running on the target service node to a detection module corresponding to the identifier of the service carried in the check request message;

sending, by a detection module on each target service node according to the received network address, a detection message to the target backend server corresponding to the received network address to detecting a status of the target backend server; and sharing the status of the target backend server to a first virtual load balancer on an access node; and obtaining, by the first virtual load balancer, a status of the target backend server on each target service node, and updating, according to the status of the target backend server on each target service node, a recorded status of the backend server providing the service.

In a possible design, the detection module on each target service node is deployed in a first namespace on the target service node, and the first virtual load balancer is deployed in a second namespace on the access node, where the first namespace and the second namespace have a same virtual IP address.

In a possible design, the method includes: constructing, by the detection module, a notification packet, and sending the notification packet to the first virtual load balancer, where a source IP address of the notification packet is the virtual IP address, a destination IP address of the notification packet is a subnet broadcast address corresponding to the virtual IP address, and the notification packet carries the status of the target backend server running on the target service node on which the detection module is located.

In a possible design, namespaces corresponding to different services have different VLAN identifiers, where a VLAN identifier of the first namespace and a VLAN identifier of the second namespace are the same; or the sending, by the detection module, the notification packet to the first virtual load balancer includes:

sending, by the detection module, the notification packet to the first virtual load balancer through a tunnel between the access node and each target service node.

In a possible design, when a client accessing the service runs on a target service node, the target service node further includes a second virtual load balancer, and the method further includes:

sending, by the detection module on the target service node, the status of the target backend server on the target service node to the second virtual load balancer.

In a possible design, the second virtual load balancer receives the status that is of the target backend server on the target service node and that is sent by the detection module on the target service node, and updates the recorded status of the target backend server.

In a possible design, the second virtual load balancer receives a request that is for accessing the service and that is sent by the client, and selects, for the client according to the updated status of the backend server, a backend server providing the service.

In a possible design, the cloud management platform records a correspondence among the identifier of the service, a network address of each backend server running the service, and an identifier of a service node on which the backend server is located.

In a possible design, after the determining, by the detection module, a status of the target backend server, and the updating, a recorded status of the backend server providing the service, the method further includes:

receiving, by the first virtual load balancer, a request that is for accessing the service and that is sent by the client, and selecting, for the client according to the updated status of the backend server, a backend server providing the service.

In a possible design, each detection module records a status of a target backend server returning a response as normal, and records a status of a target backend server returning no response or returning a response upon overtime as abnormal.

According to a third aspect, an embodiment of the present invention provides a service node, including a receiving module, a processing module, a sending module, a detection module corresponding to a service, and at least one backend server, where the receiving module is configured to receive a check request message sent by a cloud management platform, where the check request message is used to perform health check on a backend server providing the service, and the check request message carries an identifier of the service, and a network address of the target backend server that runs on the service node and that provides the service;

the processing module is configured to determine, according to the identifier of the service, the detection module corresponding to the service;

the sending module is configured to send the network address of the target backend server running on the service node to the detection module determined by the processing module; and the detection module is configured to send a detection message to the target backend server corresponding to the network address, determine a status of the target backend server, and share the status of the target backend server to a first virtual load balancer on an access node.

In a possible design, the detection module on the service node is deployed in a first namespace on the service node, and the first virtual load balancer is deployed in a second namespace on the access node, where the first namespace and the second namespace have a same virtual IP address.

In a possible design, the detection module is specifically configured to construct a notification packet, and send the notification packet to the first virtual load balancer, where a source IP address of the notification packet is the virtual IP address, a destination IP address of the notification packet is a subnet broadcast address corresponding to the virtual IP address, and the notification packet carries the status of the target backend server corresponding to the network address.

In a possible design, namespaces corresponding to different services have different VLAN identifiers, where a VLAN identifier of the first namespace and a VLAN identifier of the second namespace are the same; or the detection module is further specifically configured to send the notification packet to the first virtual load balancer through a tunnel between the access node and each target service node.

In a possible design, when a client accessing the service runs on the service node, the service node further includes a second virtual load balancer; and the detection module is further configured to send the status of the backend server on the service node to the second virtual load balancer.

In a possible design, the detection module is specifically configured to record a status of a target backend server returning a response as normal, and record a status of a target backend server returning no response or returning a response upon overtime as abnormal.

According to a fourth aspect, an embodiment of the present invention provides a health check method in a distributed load balancing system, including:

receiving, by a service node, a check request message sent by a cloud management platform, where the check request message is used to perform health check on a backend server providing a service, and the check request message carries an identifier of the service, and a network address of the target backend server that runs on the service node and that provides the service;

sending, by the service node, the network address of the target backend server running on the target service node to a detection module corresponding to the identifier of the service carried in the check request message; and sending, by the detection module according to the received network address, a detection message to the target backend server corresponding to the received network address to detecting a status of the target backend server corresponding to the network address; and sharing the status of the target backend server corresponding to the network address to a first virtual load balancer on an access node.

In a possible design, the detection module on the service node is deployed in a first namespace on the service node, and the first virtual load balancer is deployed in a second namespace on the access node, where the first namespace and the second namespace have a same virtual IP address.

In a possible design, the sharing the status of the backend server corresponding to the network address to a first virtual load balancer on an access node includes:

constructing, by the detection module, a notification packet, and sending the notification packet to the first virtual load balancer, where a source IP address of the notification packet is the virtual IP address, a destination IP address of the notification packet is a subnet broadcast address corresponding to the virtual IP address, and the notification packet carries the status of the target backend server corresponding to the network address.

In a possible design, namespaces corresponding to different services have different VLAN identifiers, where a VLAN identifier of the first namespace and a VLAN identifier of the second namespace are the same; or the sending, by the detection module, the notification packet to the first virtual load balancer includes:

sending, by the detection module, the notification packet to the first virtual load balancer through a tunnel between the access node and each target service node.

In a possible design, when a client accessing the service runs on the service node, the service node further includes a second virtual load balancer, and the method further includes:

sending, by the detection module, the status of the backend server on the service node to the second virtual load balancer.

In a possible design, the determining, by the detection module, a status of the target backend server corresponding to the network address includes:

recording, by the detection module, a status of a target backend server returning a response as normal, and recording a status of a target backend server returning no response or returning a response upon overtime as abnormal.

According to a fifth aspect, an embodiment of the present invention provides a computer storage medium, which is used to store a computer software instruction used for health check in the foregoing distributed load balancing system. The computer software instruction includes a program used in the devices configured to perform the health check in the distributed load balancing system in the foregoing aspects.

Technical effects obtained in the second aspect to the fifth aspect of the foregoing embodiments of the present invention are similar to those obtained by using corresponding technical means in the first aspect, and details are not described herein again.

In conclusion, the technical solutions provided in the embodiments of the present invention bring the following beneficial effects:

In the embodiments of the present invention, a cloud management platform determines multiple target backend servers providing a service, and an identifier of each target service node on which the multiple target backend servers are located, and sends a check request message to each target service node. Each target service node sends a detection message to the target backend server by using a detection module, detects a status of the target backend server that provides the service and that is located on the target service node, and shares the status of the target backend server to a first virtual load balancer on an access node by using the detection module, so that the first virtual load balancer updates a recorded status of the backend server providing the service. The detection message may be sent by using the detection module to obtain the status of the target backend server, and the status of the target backend server may be shared to the first virtual load balancer by using the detection module. Therefore, not only a quantity of detection messages in a load balancing system is reduced, but also signaling load on the access node is reduced. IP addresses of a first namespace in the target service node and a second namespace in the access node are the same, and therefore IP address resources are reduced.

DESCRIPTION OF EMBODIMENTS

To make the objectives, technical solutions, and advantages of the embodiments of the present invention clearer, the following further describes implementations of the embodiments of the present invention in detail with reference to the accompanying drawings.

Figure 1:
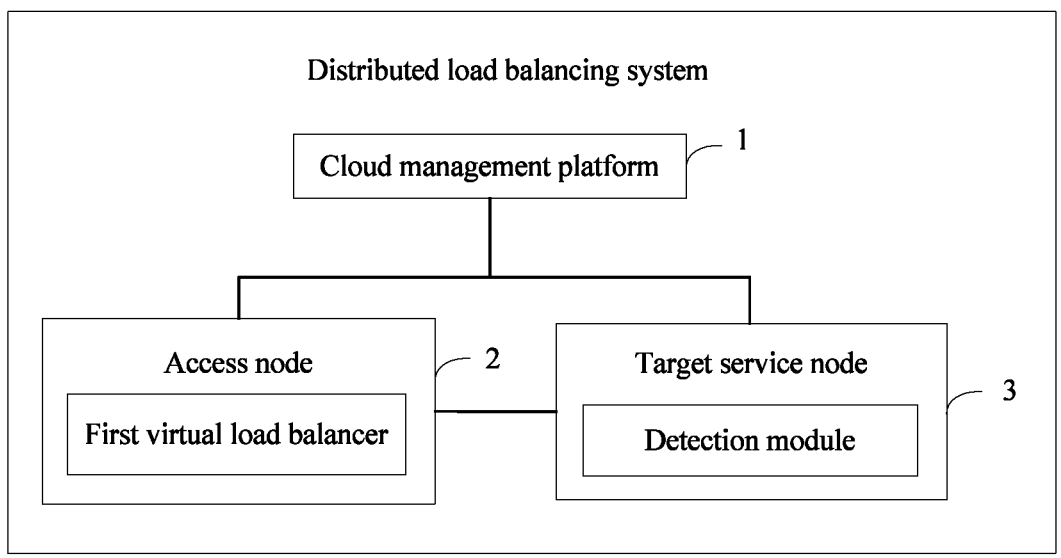
FIG. 1 is a schematic diagram of a distributed load balancing system according to an embodiment of the present invention.

FIG. 1 is a distributed load balancing system according to an embodiment of the present invention. The distributed load balancing system includes a cloud management platform 1, an access node 2, and at least one service node 3. The access node 2 and the at least one service node 3 may be physical servers. A first virtual load balancer runs on the access node 2, and at least one backend server runs on each service node 3 of the at least one service node 3. A backend server is configured to provide a service. At least one detection module is deployed on each service node 3. Preferably, a detection module may be configured to obtain a status of a backend server providing a service.

Figure 2:
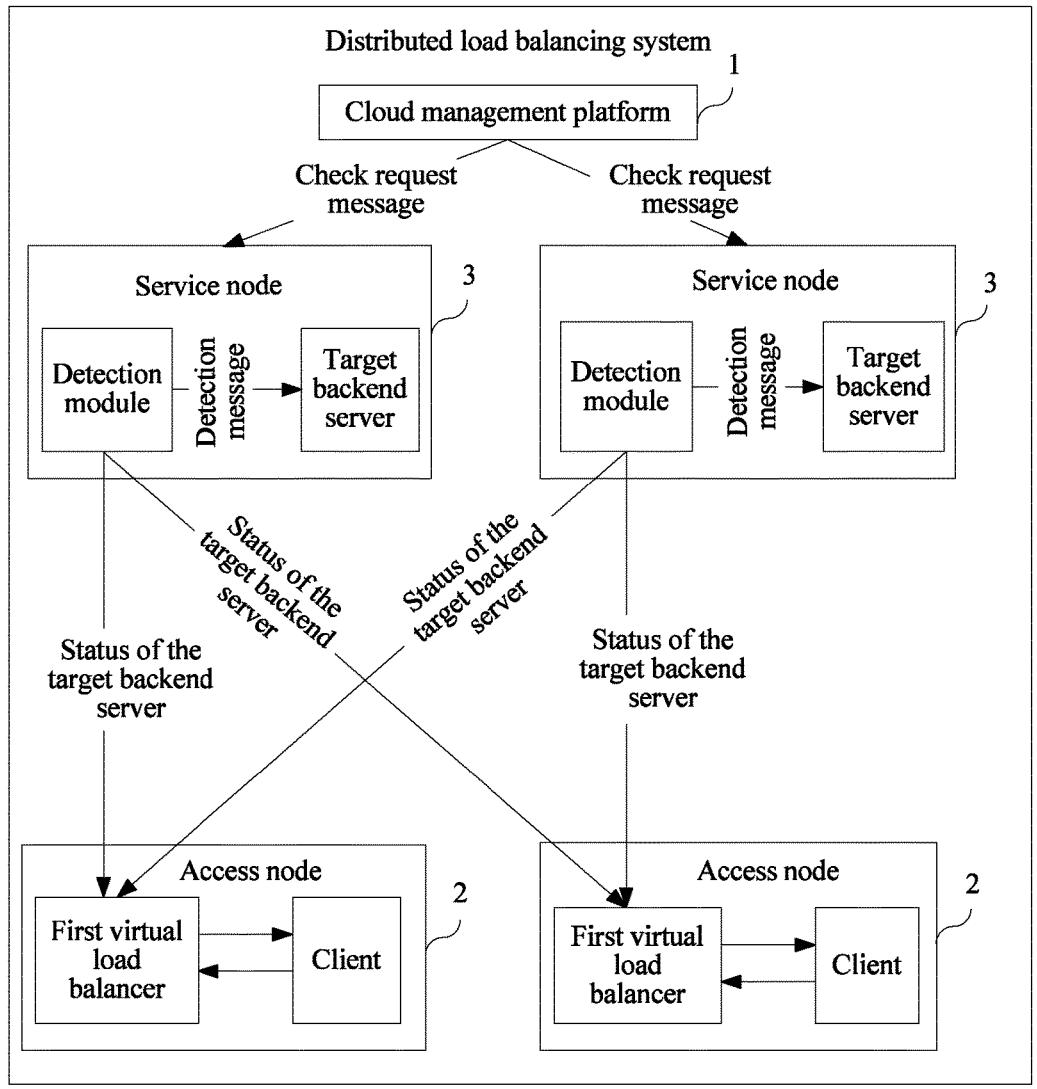
FIG. 2 is a schematic diagram of another distributed load balancing system according to an embodiment of the present invention.

Referring to FIG. 2, the cloud management platform 1 may manage a topology of the distributed load balancing system. The cloud management platform 1 records a correspondence among an identifier of the service, a network address of each backend server running the service, and an identifier of a service node 3 on which each backend server is located. Therefore, when starting health check, the cloud management platform 1 may determine, according to the identifier of the service, multiple target backend servers providing the service, and a network address of each target backend server of the multiple target backend servers, determine an identifier of a target service node 3 on which each target backend server is located, and send a check request message to each target service node 3. The check request message carries a network address of the target backend server corresponding to the target service node 3.

Each target service node 3 receives the check request message sent by the cloud management platform 1, determines a detection module corresponding to the identifier of the service on the service node 3, and sends the network address of the target backend server running on the target access node 3 to the detection module.

The detection module sends a detection message to the target backend server according to the network address of the target backend server, detects a status of the target backend server, and shares the status of the target backend server to the first virtual load balancer on the access node 2.

The first virtual load balancer obtains a status of the target backend server on each target service node, and updates, according to the status of the target backend server on each target service node, a recorded status of the backend server providing the service.

Figure 3:
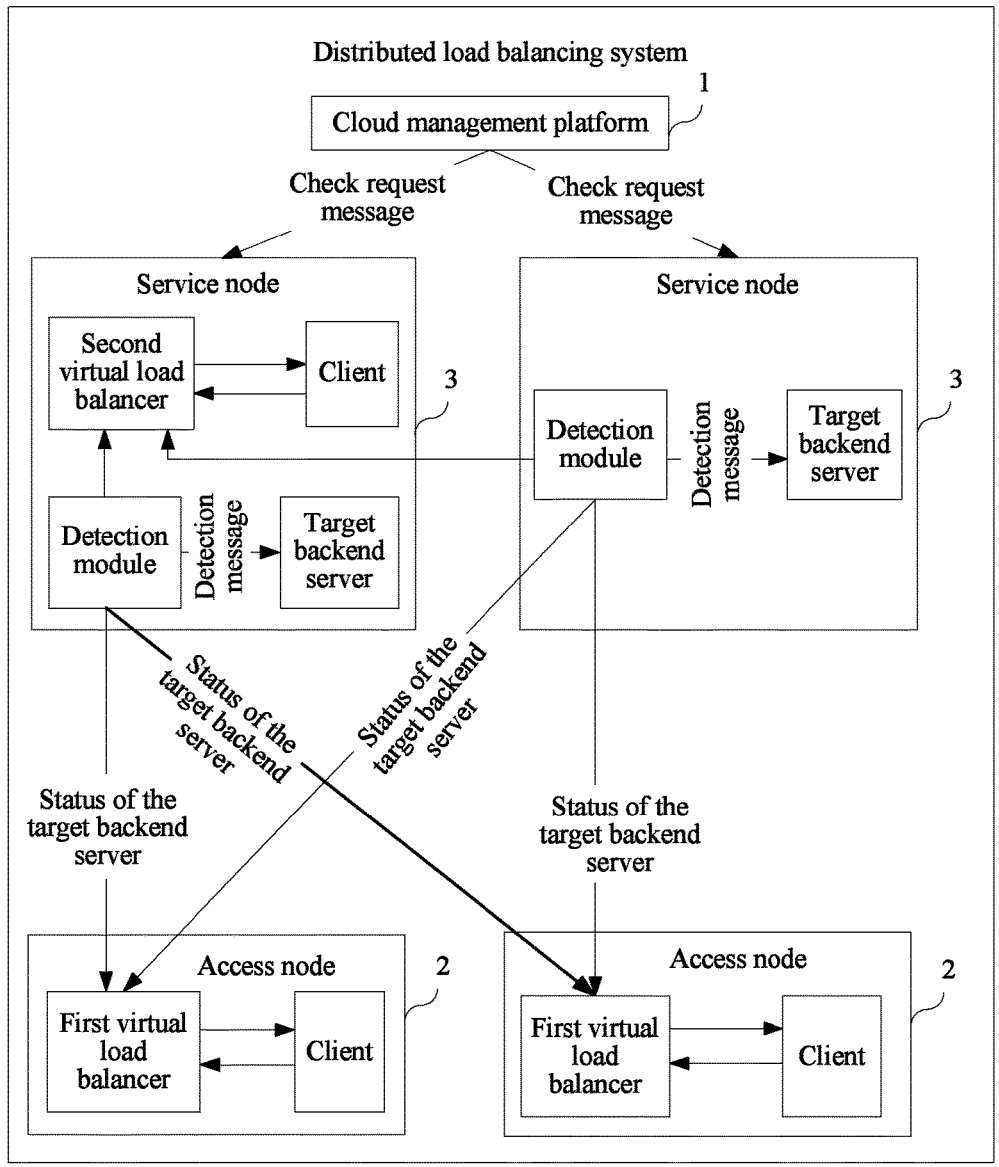
FIG. 3 is a schematic diagram of still another distributed load balancing system according to an embodiment of the present invention.

Referring to FIG. 3, in a possible design of the embodiments of the present invention, in addition to the at least one backend server running on the service node 3, a client accessing the service may further run on the service node 3. Therefore, when the client accessing the service runs on a target service node 3, the target service node 3 further includes a second virtual load balancer.

The detection module on the target service node 3 sends the status of the target backend server on the target service node 3 to the second virtual load balancer.

The second virtual load balancer obtains the status of the target backend server on each target service node, and updates, according to the status of the target backend server on each target service node, the recorded status of the backend server providing the service.

The backend server runs on a virtual machine (Virtual Machine, VM) or in a container on the service node 3. Therefore, the network address of the backend server is an address of the VM or the container on/in which the backend server runs.

The cloud management platform 1 may be an independent device independent of the access node 2 and the service node 3, or may be a management device integrated in the service node 3, or may be a management device integrated in the access node 2.

Figure 4:
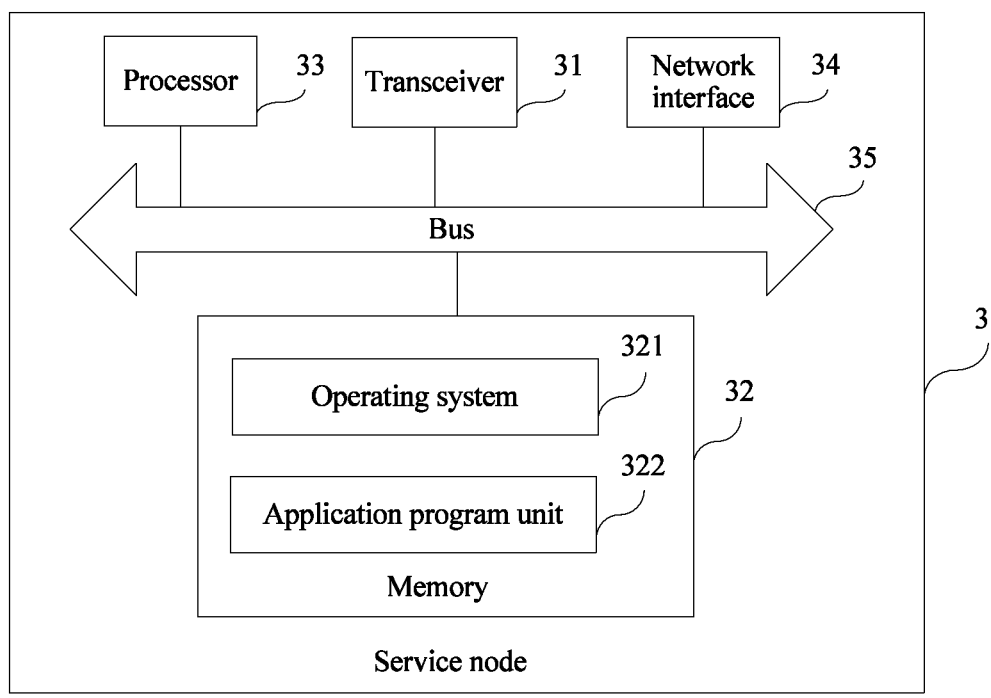
FIG. 4 is a structural block diagram of a service node according to an embodiment of the present invention.

Referring to FIG. 4, FIG. 4 shows a service node 3 according to an embodiment of the present invention. The service node 3 includes a transceiver 31 and a memory 32. The service node 3 may further include a processor 33 and a network interface 34. The memory 32 and the network interface 34 are separately connected to the processor 33. The memory 32 is configured to store program code, where the program code includes a computer operation instruction. The processor 33 and the transceiver 31 are configured to execute the program code stored in the memory 32, so as to implement related data processing, and may interact with a base station or another management device by using the network interface 34.

The processor 33 includes one or more processing cores. The processor 33 runs a software program and a unit, so as to perform the following health check method in a distributed load balancing system.

In a possible design, the service node 3 may further include components such as a bus 35. The memory 32 and the network interface 34 are separately connected to the processor 33 and the transceiver 31 by using the bus 35.

The memory 32 may be configured to store a software program and a unit. Specifically, the memory 32 may store an operating system 321, an application program unit 322 for at least one function. The operating system 321 may be an operating system such as a real-time operating system (Real Time eXecutive, RTX), LINUX, UNIX, WINDOWS, or OS X.

Figure 5A:
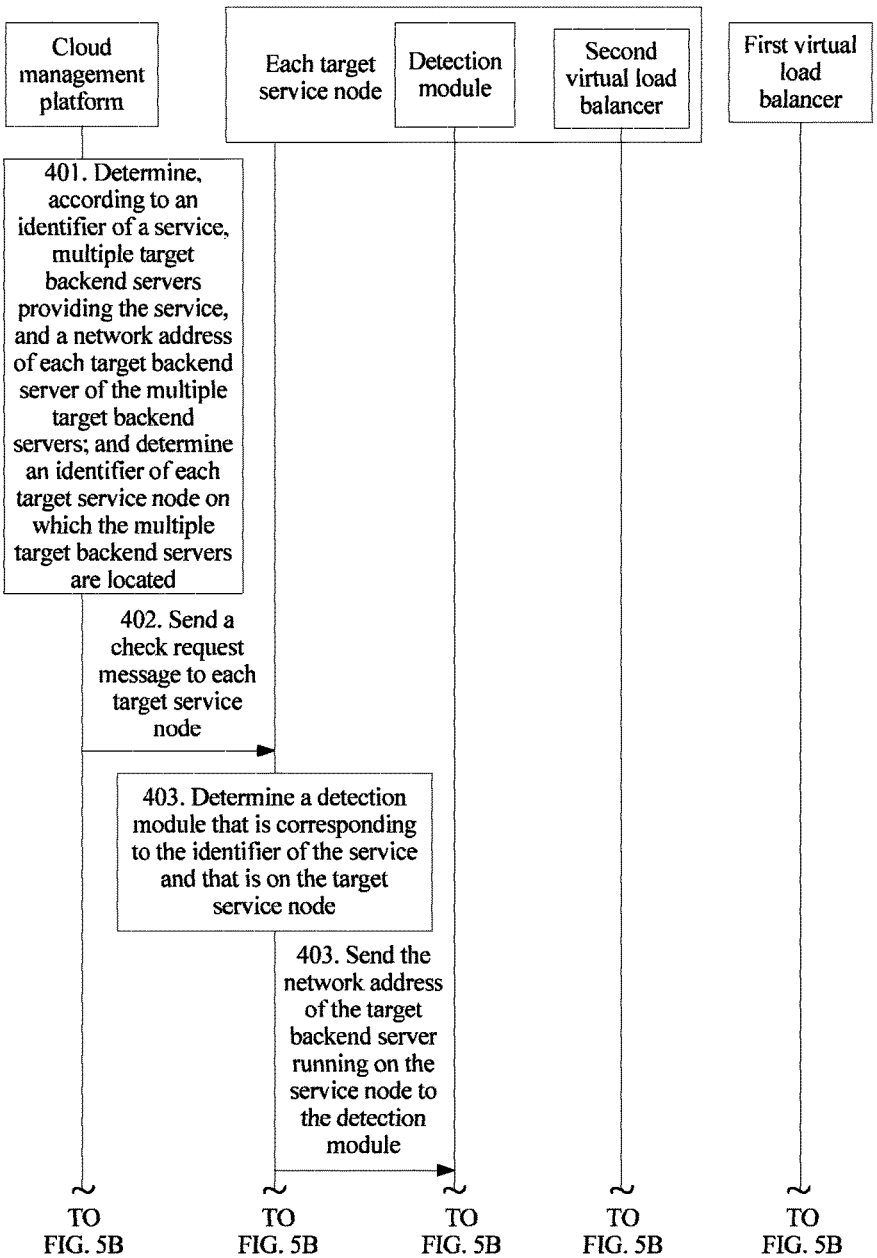
FIG. 5A and FIG. 5B are a flowchart of a health check method in a distributed load balancing system according to an embodiment of the present invention.
Figure 5B:
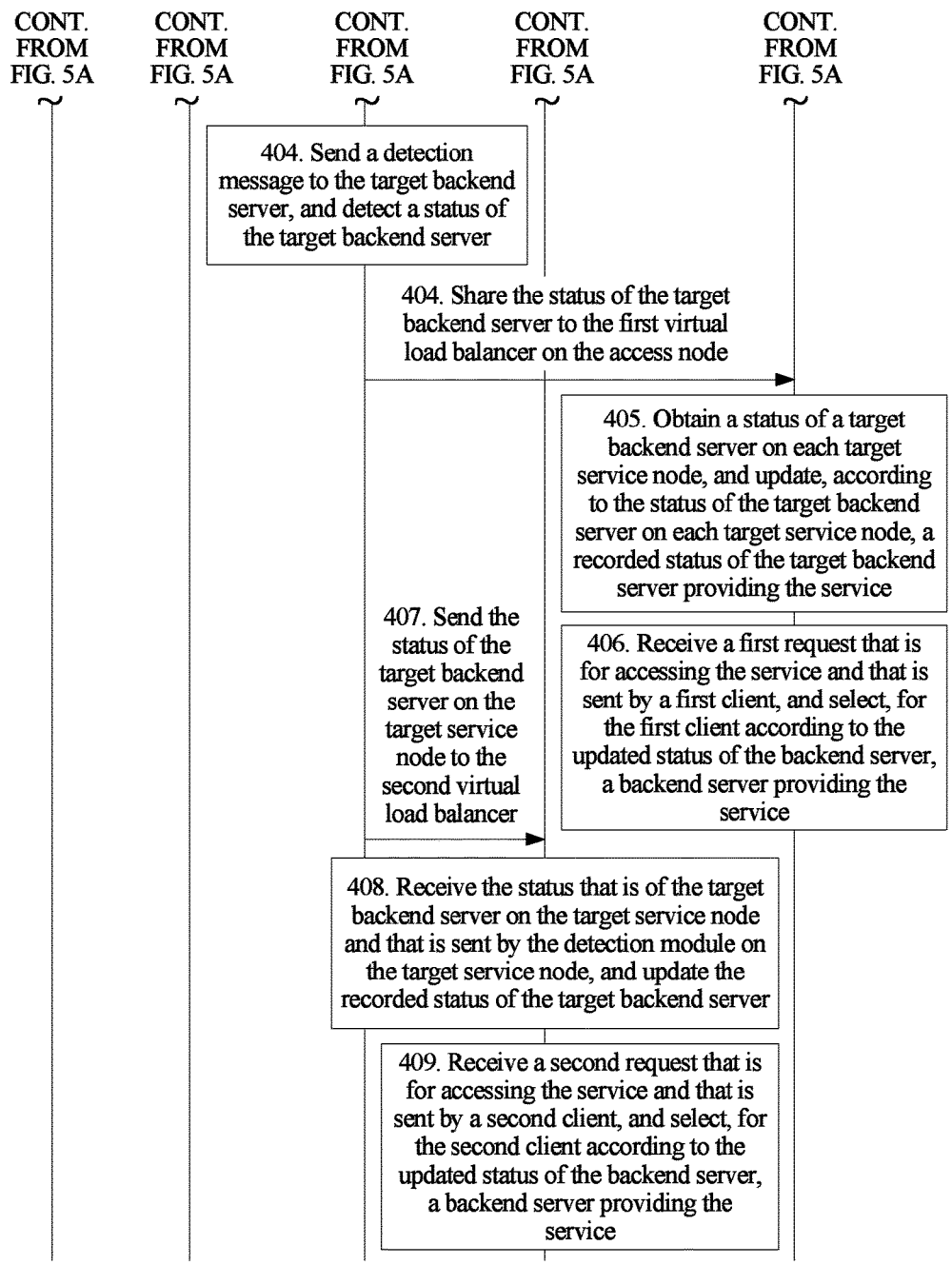

Referring to FIG. 5A and FIG. 5B, an embodiment of the present invention provides a health check method in a distributed load balancing system. The method is applied to the distributed load balancing system. The distributed load balancing system includes a cloud management platform, an access node, and at least one service node. The access node and the at least one service node may be physical servers. A first virtual load balancer runs on the access node, and at least one backend server runs on the service node. The method includes the following steps.

Step 401: The cloud management platform determines, according to an identifier of a service, multiple target backend servers providing the service, and a network address of each target backend server of the multiple target backend servers; and determines an identifier of each target service node on which the multiple target backend servers are located.

The cloud management platform is configured to manage the distributed load balancing system. In addition, the cloud management platform records a correspondence among the identifier of the service, a network address of each backend server running the service, and an identifier of a service node on which the backend server is located. When starting health check, the cloud management platform obtains an identifier of a to-be-checked service, and determines multiple target backend servers providing the service, a network address of each target backend server of the multiple target backend servers, and the identifier of each target service node on which the multiple target backend servers are located according to the identifier of the service and from the correspondence among the identifier of the service, a network address of each backend server running the service, and an identifier of a service node on which the backend server is located.

In this embodiment of the present invention, when the cloud management platform starts the health check, the cloud management platform may periodically start the health check according to configuration of a tenant. The cloud management platform may also start the health check when receiving a check startup request that is sent by the tenant.

When the cloud management platform periodically starts the health check according to the configuration of the tenant, the cloud management platform obtains the identifier of the to-be-checked service according to the configuration of the tenant. For example, the tenant may configure that health check is performed once every 10 s on a backend server providing a service 1, and health check is performed once every 15 s on a backend server providing a service 2.

When the cloud management platform receives the check startup request that is sent by the tenant, and starts the health check, a step of obtaining the identifier of the to-be-checked service may be as follows:

A management page provided by the cloud management platform for the tenant includes service information. The service information includes an identifier of at least one service and an identifier of a service node providing each service. The tenant logs in to and accesses the management page provided by the cloud management platform, and selects, from the identifier of the at least one service, an identifier of a service on which health check is to be performed. The cloud management platform uses an identifier of a service selected by a user as the identifier of the to-be-checked service, and initiates health check on an application server providing a service.

The identifier of the service may be a name of the service, or an identity (identity, ID) of the service, or the like. For example, the identifier of the service may be a virtual load balancing service 123 (virtual Load Balancer, vLBtest123). The target backend server runs on a VM or in a container on the target service node. Therefore, the network address of the target backend server may be an address of the VM or the container on/in which the target backend server runs. The identifier of the target service node may be a number, an address, or the like of the target service node.

Step 402: The cloud management platform sends a check request message to each target service node, where each check request message carries a network address of the target backend server running on the target service node that receives the check request message, and the identifier of the service.

For each target service node, the cloud management platform obtains the network address of the target backend server that runs on the target service node and that provides the service, and sends the check request message to the target service node according to the identifier of the target service node. The check request message carries the network address of the target backend server that is located on the target service node and that provides the service, and the identifier of the service.

For example, the cloud management platform determines, according to the identifier of the service, that the target backend server providing the service includes a target backend server 1, a target backend server 2, a target backend server 3, and a target backend server 4. The target backend server 1 and the target backend server 2 are located on a target service node 1, and the target backend server 3 and the target backend server 4 are located on a target service node 2. In this case, the cloud management platform sends a check request message to the target service node 1 according to an identifier of the target service node 1. The check request message carries identifiers of the target backend server 1, the target backend server 2, and the service. The cloud management platform sends a check request message to the target service node 2 according to an identifier of the target service node 2. The check request message carries identifiers of the target backend server 3, the target backend server 4, and the service.

Step 403: Each target service node receives the check request message, determines a detection module that is corresponding to the identifier of the service and that is on the target service node, and sends the network address of the target backend server running on the service node to the detection module.

At least one detection module may be deployed on each target service node, and one service is corresponding to one detection module. Therefore, each target service node stores a correspondence between an identifier of each service and a detection module corresponding to each service. In a specific implementation scenario, the correspondence may be stored in various storage forms in the prior art, including but not limited to a correspondence table. The correspondence may be stored on a service node or in another storage medium connected to the service node. Correspondingly, for each target service node, a step in which the target service node receives the check request message and determines the detection module that is corresponding to the identifier of the service and that is on the target service node may be as follows:

The target service node receives the check request message, obtains the identifier of the service from the check request message, and obtains, according to the identifier of the service, the detection module corresponding to the service from the correspondence between an identifier of each service and a detection module corresponding to each service.

It should be noted that only one detection module may also be deployed on each target service node, and multiple services are corresponding to one detection module. The detection module is configured to detect a status of a target backend server that is on the target service node and that provides multiple services. In this case, this step may be replaced with the following: Each target service node receives the check request message, determines a detection module deployed on the target service node, and sends the network address of the target backend server running on the service node to the detection module.

Step 404: A detection module on each target service node sends, according to the network address received by the detection module, a detection message to the target backend server corresponding to the network address, detects a status of the target backend server, and shares the status of the target backend server to the first virtual load balancer on the access node.

For any detection module, this step may be implemented by using the following steps (1) and (2), including:

(1): The detection module sends, according to the received network address, a detection request to the target backend server corresponding to the received network address, and determines the status of the target backend server.

When the status of the target backend server is normal, the target backend server returns a response to the detection module in a timely manner when receiving the detection request sent by the detection module. When the status of the target backend server is abnormal, the target backend server cannot receive the detection request sent by the detection module, or cannot return a response to the detection module in a timely manner when receiving the detection request sent by the detection module. Correspondingly, this step may be as follows:

The detection module sends, according to the received network address, a detection request to the target backend server corresponding to the received network address; records a status of a target backend server returning a response within first preset duration as normal, and records a status of a target backend server returning no response or returning a response upon overtime within the first preset duration as abnormal.

The first preset duration may be set and changed according to a requirement of a user. This is not specifically limited in this embodiment of the present invention. For example, the first preset duration may be two seconds, 30 milliseconds, or the like.

The received network address includes an IP address and a port number of a target backend server. Correspondingly, a step of sending, according to the received network address, the detection message to the target backend server corresponding to the network address by the detection module may be as follows:

The detection module sends the detection message to the target backend server according to the IP address and the port number of the target backend server.

For example, the IP address of the target backend server is IP3, and the port number of the target backend server is 80. In this case, the detection module sends the detection message to the target backend server with the IP address IP3 and the port number 80.

(2): The detection module shares the status of the target backend server to the first virtual load balancer on the access node.

In this step, the detection module may actively send the status of the target backend server to the first virtual load balancer on the access node, or the detection module stores the status of the target backend server in a database, and the first virtual load balancer on the access node actively obtains the status of the target backend server from the database.

When the detection module actively sends the status of the target backend server to the first virtual load balancer on the access node, this step may be implemented by using the following steps (2-1) and (2-2), including:

(2-1): The detection module constructs a notification packet, where the notification packet carries the status of the backend server corresponding to the network address.

Figure 6:
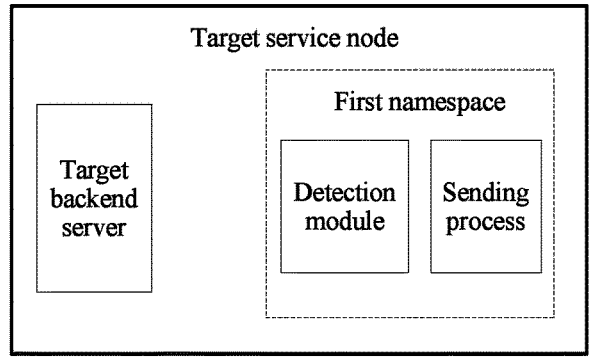
FIG. 6 is a structural block diagram of another service node according to an embodiment of the present invention.
Figure 7:
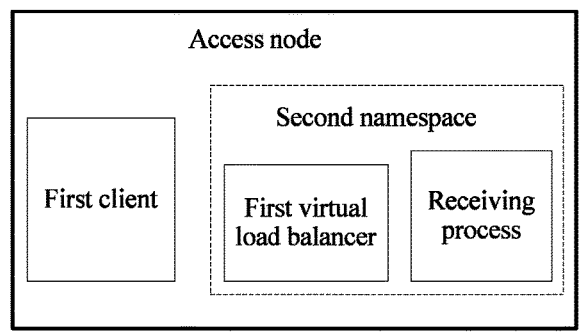
FIG. 7 is a structural block diagram of an access node according to an embodiment of the present invention.

Referring to FIG. 6 and FIG. 7, to reduce IP address resources, the detection module on each target service node is deployed in a first namespace on the target service node, and the first virtual load balancer running on the access node is deployed in a second namespace on the access node, where the first namespace and the second namespace have a same IP address. That is, for a same service, a first namespace in which a detection module corresponding to the service is located and a second namespace in which a first virtual load balancer corresponding to the service is located have a same virtual IP. For example, both the IP address of the first namespace and the IP address of the second namespace are a virtual IP address IP0.

It should be noted that the namespace in this embodiment of the present invention provides a lightweight virtualization form, and resource separation is performed on a process resource, a communication resource, a network resource, and the like by using a logical space. Each namespace has an independent IP address, thereby implementing resource separation on a physical machine, and ensuring no mutual interference between different namespaces. A software module such as the first virtual load balancer and the detection module may run in the namespace. When modules corresponding to multiple types of services exist on a same node, modules of different services may run in different namespaces, so as to implement service separation by using a namespace technology.

The first virtual load balancer on the access node provides a load balancing service only for a client running on the access node, that is, allocates, to the client on the node, an application server providing a service. The first virtual load balancer may further receive, by using a receiving process, the notification packet sent by the detection module. A receiving process in the access node is also deployed in the second namespace on the access node.

A source IP address of the notification packet is a virtual IP address of the first namespace, and a destination IP address of the notification packet is a subnet broadcast address corresponding to the virtual IP address. Therefore, when the virtual IP address is used as the source IP address, and the subnet broadcast address corresponding to the virtual IP address is used to broadcast the notification packet, all first virtual load balancers in a same local area network can receive the notification packet.

If the target service node on which the detection module is located includes multiple target backend servers providing the service, in an implementation, the detection module may construct multiple notification packets, and one notification packet carries a status of one target backend server. To reduce a quantity of notification packets, and improve efficiency of obtaining the status of the target backend server by the first virtual load balancer, in another implementation, the detection module may construct only one notification packet. The notification packet carries correspondences between statuses of the multiple target backend servers on the target service node on which the detection module is located and network addresses of the target backend servers.

For example, target backend servers on the target service node 1 are respectively the target backend server 1 and the target backend server 2, network addresses of the target backend server 1 and the target backend server 2 are respectively IP3 and IP5, and statuses of the target backend server 1 and the target backend server 2 are respectively normal and abnormal. The detection module constructs a notification packet, and the notification packet may be {IP3: normal; IP5: abnormal}.

A format of the notification packet may be set and changed according to a requirement of a user. No specific limitation is imposed on the format of the notification packet in this embodiment of the present invention. For example, the format of the notification packet may be a User Datagram Protocol (User Datagram Protocol, UDP) packet format, or may be a raw (raw) IP packet format.

(2-2): The detection module sends the notification packet to the first virtual load balancer.

In a possible implementation, network separation may be performed by using a virtual local area network (Virtual Local Area Network, VLAN) identifier of the namespace. That is, namespaces corresponding to different services have different VLAN identifiers, so that detection modules and virtual load balancers corresponding to different services are located in different virtual local area networks, thereby ensuring that the notification packet sent by the detection module is received only by virtual load balancers in a same local area network.

For example, a detection module corresponding to a service 1 is deployed in the first namespace on the target service node, a first virtual load balancer corresponding to the service 1 is deployed in the second namespace on the access node, and a VLAN identifier of the first namespace and a VLAN identifier of the second namespace are the same and both are VLAN0. This indicates that the first namespace and the second namespace that are corresponding to the service 1 are in a same virtual local area network. When the detection module uses the virtual IP address of the first namespace as the source IP address, and the subnet broadcast address corresponding to the virtual IP address as the destination IP address to send the notification packet, all first virtual load balancers in the same virtual local area network can receive the notification packet.

For another example, if a backend server providing another service exists on the target service node, the another service may be a service 2. Both a VLAN identifier of a first namespace corresponding to the service 2 and a VLAN identifier of a second namespace corresponding to the service 2 may be set to a same VLAN 1. This indicates that the first namespace and the second namespace that are corresponding to the service 2 are in a same virtual local area network.

Therefore, namespaces corresponding to different services have different VLAN identifiers. In a same service, the VLAN identifier of the first namespace and the VLAN identifier of the second namespace are the same, so that network separation for different services by using namespaces is implemented, thereby ensuring that the notification packet sent by the detection module is received only by the first virtual load balancers in the same virtual local area network.

The destination IP address is the subnet broadcast address corresponding to the virtual IP address, the first virtual load balancer is in the second namespace on the access node, and the IP address of the second namespace is within a range of the subnet broadcast address. Therefore, this step may be as follows: The detection module sends the notification packet to the first virtual load balancer by using the virtual IP address of the first namespace as the source IP address, and the subnet broadcast address corresponding to the virtual IP address as the destination IP address.

A sending process is deployed in the target service node, and the sending process is also deployed in the first namespace on the target service node. The detection module sends the notification packet to the first virtual load balancer by using the sending process and by using the virtual IP address of the first namespace as the source IP address, and the subnet broadcast address corresponding to the virtual IP address as the destination IP address.

For example, a detection module on the target service node 3 broadcasts a packet to an access node 1 and an access node 2. If IP addresses of second namespaces on the access node 1 and the access node 2 are IP0 (for example, 192.168.1.10), an IP address of a first namespace on the target service node 3 is also IP0. In this case, the detection module on the target service node 3 sends the notification packet {IP3: status} by using the sending process and by using IP0 as the source IP address, and the subnet broadcast address (for example, 192.168.1.255, which indicates that all IP addresses within a range of 192.168.1.0 to 192.168.1.255 are within a range of the subnet broadcast address) corresponding to the virtual IP addresses of the first namespace and the second namespace as the destination IP address. In this way, first virtual load balancers that are on all access nodes and that are in the same local area network can receive the notification packet sent by the detection module.

In another possible implementation, a tunnel may be established between the first virtual load balancer and the target service node, and the notification packet is sent to the first virtual load balancer through the tunnel, thereby ensuring that the notification packet is received only by the first virtual load balancers in the same local area network. In this case, this step may be as follows:

The detection module sends the notification packet to the first virtual load balancer through the tunnel between the access node and the target service node on which the detection module is located.

A sending process is deployed on each target service node. The detection module sends the notification packet to the first virtual load balancer through the tunnel between the access node and the target service node on which the detection module is located and by using a sending process on the target service node on which the detection module is located.

It should be noted that before this step, a tunnel is established between the access node and each target service node according to an identifier of the access node and the identifier of each target service node. In addition, during establishment of the tunnel between the access node and each target service node, the first namespace and the second namespace do not perceive each other, and the VLAN identifier of the first namespace and the VLAN identifier of the second namespace may be the same or different. The sending process may also be deployed in the first namespace.

If the detection module constructs multiple notification packets, in this step, the detection module sends the multiple notification packets to the first virtual load balancer through the tunnel between the access node and the target service node on which the detection module is located.

It should be noted that each target service node sends the status of the target backend server on the target service node to the first virtual load balancer by using step 404.

It should be further noted that in another possible implementation, step 404 may further be as follows: After sending a detection message to a target backend server that provides the service and that is on the node on which the detection module is located, the detection module obtains a detection result, and shares the detection result to the first virtual load balancer, and the first virtual load balancer determines and updates a status of the target backend server according to the detection result. In an example, the detection result may be no response, responding duration, response timeout, connection interruption, or the like. The detection module reports the detection result to the first virtual load balancer, and the first virtual load balancer determines the status of the target backend server according to the detection result. For example, when the detection result of the target backend server is no response, response timeout, or connection interruption, the first virtual load balancer determines that the status of the target backend server is abnormal; when the detection result of the target backend server is responding duration, and the responding duration is not greater than first preset duration, the first virtual load balancer determines that the status of the target backend server is normal; or when the detection result of the target backend server is responding duration, and the responding duration is greater than first preset duration, the first virtual load balancer determines that the status of the target backend server is abnormal. The detection module may share the status of the target backend server to the first virtual load balancer in the foregoing detection result sharing manner.

Step 405: The first virtual load balancer obtains a status of a target backend server on each target service node, and updates, according to the status of the target backend server on each target service node, a recorded status of the backend server providing the service.

This step may be implemented by using the following steps (1) to (3), including:

(1): The first virtual load balancer receives the notification packet sent by the detection module that is on each target service node and that is corresponding to the service.

A receiving process is deployed on the access node. The first virtual load balancer receives, by using the receiving process, the notification packet sent by the detection module that is on each target service node and that is corresponding to the service. The receiving process may be deployed in the second namespace on the access node.

(2): The first virtual load balancer parses a notification packet from each target service node, and obtains statuses of the multiple target backend servers.

To prevent the notification packet from carrying a status of a backend server providing another service, the notification packet sent by the target service node may further carry the identifier of the service, and the access node stores a correspondence between an identifier of the service and a network address of the target backend server providing the service. When receiving the notification packet from the target service node, the first virtual load balancer extracts and updates, according to the identifier carried in the notification packet, a status of a target application server providing a service corresponding to the first virtual load balancer.

(3): The first virtual load balancer updates the recorded status of the target backend server providing the service.

The first virtual load balancer obtains a status list of the target backend server providing the service, and updates the status that is of the target backend server and that is in the status list according to the status that is of the target backend server and that is obtained from each notification packet. The status list is used to record statuses of all backend servers providing the service.

For each notification packet, a step of updating, by the first virtual load balancer, the status of the target backend server in the status list according to the status of the target backend server obtained from the notification packet may be as follows: The first virtual load balancer determines whether the status list includes the status of the target backend server. If the status list includes the status of the target backend server, whether the status of the target backend server obtained from the notification packet is the same as the status of the target backend server stored in the status list is determined. If the status of the target backend server obtained from the notification packet is the same as the status of the target backend server stored in the status list, the status of the target backend server does not need to be updated; or if the status of the target backend server obtained from the notification packet is different from the status of the target backend server stored in the status list, the status of the target backend server stored in the status list is changed to the status of the target backend server obtained from the notification packet. If the status list does not include the status of the target backend server, the first virtual load balancer stores the status of the target backend server in the status list.

In a possible implementation, when the first virtual load balancer stores the status of the target backend server in the status list, a timer is created. The timer counts time, and whether a status of the target backend server is received again within second preset duration is determined. If the status of the target backend server is received again within the second preset duration, the status of the target backend server in the status list is updated to the status of the target backend server received again; or if the status of the target backend server is not received again within the second preset duration, the status of the target backend server in the status list is changed to abnormal.

The second preset duration may be set and changed according to a requirement of a user, and no specific limitation is imposed on the second preset duration in this embodiment of the present invention. For example, the second preset duration may be two seconds, 30 milliseconds, or the like.

When a first client on the access node needs to access the service, the first client sends a first request for accessing the service to the first virtual load balancer, and step 406 is performed.

Step 406: The first virtual load balancer receives a first request that is for accessing the service and that is sent by a first client, and selects, for the first client according to the updated status of the backend server, a backend server providing the service.

The first virtual load balancer receives the first request that is for accessing the service and that is sent by the first client, and selects, according to the updated status of the backend server and a load balancing policy, a backend server providing the service for the client from the backend servers providing the service, and sends the first request to the selected backend server. The selected backend server receives the first request sent by the first virtual load balancer, and processes the first request, so as to provide the service for the first client.

Figure 8:
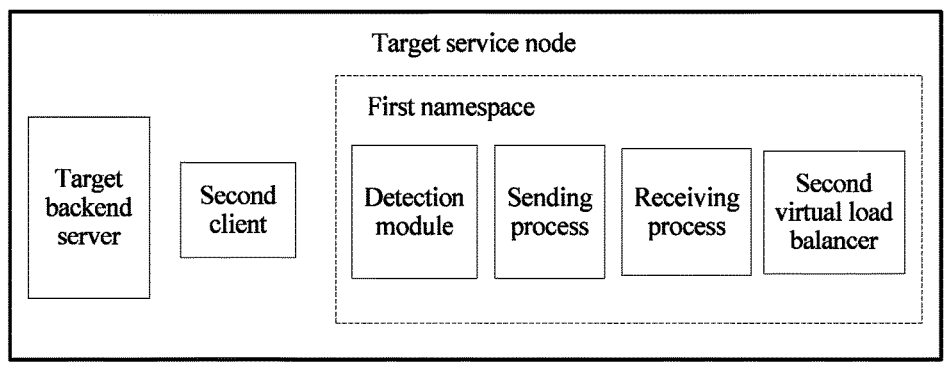
FIG. 8 is a structural block diagram of still another service node according to an embodiment of the present invention.

In a possible design of the embodiments of the present invention, referring to FIG. 8, optionally, in addition to the at least one backend server running on the target service node, a client accessing the service may also run on the target service node. In this case, the target service node further includes a second virtual load balancer and a receiving process. The second virtual load balancer and the receiving process may be deployed in the first namespace.

The second virtual load balancer is configured to obtain the status of the target backend server, and receives, by using the receiving process, the request that is for accessing the service and that is sent by the client, and further selects, for the client, the backend server providing the service. Therefore, after obtaining the status of the target backend server, the detection module on the target service node further needs to notify the second virtual load balancer on the target service node of the status of the target backend server by using the following step 407.

Step 407: The detection module on the target service node sends the status of the target backend server on the target service node to the second virtual load balancer.

The detection module on the target service node sends the status of the target backend server on the target service node to the second virtual load balancer through inter-process communication.

When the detection module on the target service node sends the status of the target backend server on the target service node to the second virtual load balancer, a notification packet may be constructed. The notification packet carries the status of the target backend server, and the notification packet is sent to the second virtual load balancer.

Step 408: The second virtual load balancer receives the status that is of the target backend server on the target service node and that is sent by the detection module on the target service node, and updates the recorded status of the target backend server.

The second virtual load balancer receives, by using the receiving process on the target service node, the notification packet that is sent by the detection module on the target node, parses the notification packet, obtains the status of the target backend server from the notification packet, and updates the recorded status of the target backend server.

Processes of parsing the notification packet and updating the recorded status of the target backend server by the second virtual load balancer are respectively the same as processes of parsing the notification packet and updating the recorded status of the target backend server providing the service by the first virtual load balancer, and details are not described herein again.

It should be noted that there is no strict time order relationship between step 404 and step 407. Step 407 may be performed after step 404, or step 404 may be performed after step 407.

When a second client that runs on the target service node and that accesses the service needs to access the service, the second client sends a second request for accessing the service to the second virtual load balancer, and step 409 is performed.

Step 409: The second virtual load balancer receives a second request that is for accessing the service and that is sent by a second client, and selects, for the second client according to the updated status of the backend server, a backend server providing the service.

The second virtual load balancer receives the second request that is for accessing the service and that is sent by the second client, selects, according to the updated status of the backend server and the load balancing policy, a backend server providing the service for the second client from the backend servers providing the service, and sends the second request to the selected backend server. The selected backend server receives the second request sent by the second virtual load balancer, and processes the second request, so as to provide the service for the second client. It should be noted that step 407 to step 409 are optional steps, which are performed only when a client accessing the service is allowed to be on the target service node.

In this embodiment of the present invention, a cloud management platform determines multiple target backend servers providing a service, and an identifier of each target service node on which the multiple target backend servers are located, and sends a check request message to each target service node. Each target service node sends a detection message to the target backend server by using a detection module, determines a status of the target backend server that provides the service and that is on the target service node, and shares the status of the target backend server to a first virtual load balancer on an access node by using the detection module, so that the first virtual load balancer updates a recorded status of the backend server providing the service. The detection message may be sent by using the detection module to obtain the status of the target backend server, and the status of the target backend server may be shared to the first virtual load balancer by using the detection module. Therefore, not only a quantity of detection messages in a load balancing system is reduced, but also signaling load on the access node is reduced.

The following is an apparatus embodiment of the embodiments of the present invention, where an apparatus may be configured to perform the method embodiment of the embodiments of the present invention. For details not disclosed in the apparatus embodiment of the embodiments of the present invention, refer to the method embodiment of the embodiments of the present invention.

Figure 9:
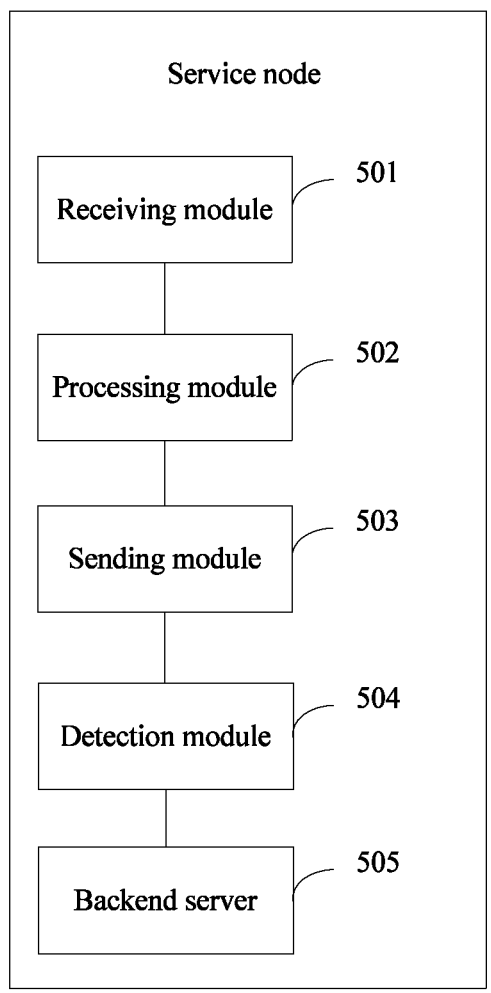
FIG. 9 is a structural block diagram of yet another service node according to an embodiment of the present invention.

FIG. 9 is a structural block diagram of a service node according to an embodiment of the present invention. The service node may implement, in a form of software, hardware, or a combination thereof, processing performed by the foregoing service node.

The service node includes a receiving module 501, a processing module 502, a sending module 503, a detection module 504 corresponding to a service, and at least one backend server 505.

The receiving module 501 is configured to perform receiving of the check request message in step 403 and an optional solution of step 403 in the foregoing embodiment.

The processing module 502 is configured to perform determining of a detection module that is corresponding to the identifier of the service and that is on the target service node in step 403 and an optional solution of step 403 in the foregoing embodiment.

The sending module 503 is configured to perform sending of the network address of the target backend server running on the service node to the detection module in step 403 and an optional solution of step 403 in the foregoing embodiment.

The detection module 504 is configured to perform step 404 and step 407 and an optional solution of step 404 and step 407 in the foregoing embodiment.

It should be noted that, when the service node provided in the foregoing embodiments performs health check in a distributed load balancing system, division of the foregoing functional modules is merely used as an example for description. In actual application, the foregoing functions may be allocated to different functional modules according to requirements for implementation, that is, an internal structure of the apparatus is divided into different functional modules, so as to implement all or some of the functions described above. In addition, the service node provided in the foregoing embodiments pertains to the same idea as the embodiment of the health check method in the distributed load balancing system. For a specific implementation process, refer to the method embodiments, and details are not described herein again.

The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may understand that all or some of the steps of the embodiments may be implemented by hardware or program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the embodiments of the present invention. Any modification, equivalent replacement, and improvement made without departing from the spirit and principle of the embodiments of the present invention shall fall within the protection scope of the embodiments of the present invention.

What is claimed is:

1. A distributed load balancing system, comprising a cloud management platform, an access node, and at least one service node, wherein the access node, a the first node, and the at least one target service nodes are physical servers, a first virtual load balancer runs on the access node, and at least one backend server runs on each of the one or more target service nodes, wherein a first node programmed to:
   determine, by the cloud management platform, according to an identifier of a service, multiple target backend servers providing the service, and a network address of each target backend server of the multiple target backend servers;
   determine, by the cloud management platform, an identifier of one or more target service nodes on which the multiple target backend servers are located; and
   send, by the cloud management platform, a check request message to each target service node, wherein each check request message carries a network address of a target backend server running on a target service node that can receive the check request message, and the identifier of the service;
   wherein each target service node is programmed to:
   receive the check request message sent to the target service node, and send the network address of the target backend server running on the target service node carried in the check request message to a detection module corresponding to the identifier of the service carried in the check request message;

send, by the detection module, according to the received network address, a detection message to the target backend server corresponding to the received network address to detect a status of the target backend server; and share, by the detection module, the status of the target backend server to the first virtual load balancer on the access node; and wherein access node is programmed to:

obtain, by the first virtual load balancer, a status of the target backend server on each target service node, and update, according to the status of the target backend server on each target service node, a recorded status of the backend server providing the service.

2. The system according to claim 1, wherein the detection module on each target service node is deployed in a first namespace on the target service node, and the first virtual load balancer is deployed in a second namespace on the access node, wherein the first namespace and the second namespace have a same virtual Internet Protocol (IP) address.

3. The system according to claim 2, wherein the detection module on each target service node is further programmed to construct a notification packet, and send the notification packet to the first virtual load balancer, wherein a source IP address of the notification packet is the virtual IP address, a destination IP address of the notification packet is a subnet broadcast address corresponding to the virtual IP address, and the notification packet carries the status of the target backend server running on the target service node on which the detection module is located.

4. The system according to claim 3, wherein namespaces corresponding to different services have different virtual local area network (VLAN) identifiers, wherein a VLAN identifier of the first namespace and a VLAN identifier of the second namespace are the same.

5. The system according to claim 3, wherein the detection module on each target service node is further programmed to send the notification packet to the first virtual load balancer through a tunnel between the access node and the target service node on which the detection module is located.

6. The system according to claim 1, wherein when a client accessing the service runs on a target service node, the target service node further comprises a second virtual load balancer; and the target service node is further programmed to send a by the detection module, the status of the target backend server on the target service node to the second virtual load balancer.

7. The system according to claim 1, wherein the cloud management platform records a correspondence among the identifier of the service, a network address of each backend server running the service, and an identifier of a service node on which the backend server is located.

8. The system according to claim 1, wherein the access node is further programmed to receive a request that is for accessing the service and that is sent by the client, and select, for the client according to the updated status of the backend server, a backend server providing the service.

9. A health check method in a distributed load balancing system, comprising:

determining, by a first node according to an identifier of a service, multiple target backend servers providing the service, and a network address of each target backend server of the multiple target backend servers;

determining, by the first node, an identifier of each target service node on which the multiple target backend servers are located; and sending, by the first node, a check request message to each target service node, wherein each check request message carries a network address of a target backend server running on a target service node that receives the check request message, and the identifier of the service;

receiving, by each target service node, the check request message, and sending the network address of the target backend server running on the target service node to a detection module corresponding to the identifier of the service carried in the check request message;

sending, by each target service node according to the received network address, a detection message to the target backend server corresponding to the received network address to detect a status of the target backend server; and sharing, each target service node, the status of the target backend server to a first virtual load balancer on an access node; and obtaining, by the access node, a status of the target backend server on each target service node, and updating, according to the status of the target backend server on each target service node, a recorded status of the backend server providing the service.

10. The method according to claim 9, wherein the detection module on each target service node is deployed in a first namespace on the target service node, and the first virtual load balancer is deployed in a second namespace on the access node, wherein the first namespace and the second namespace have a same virtual Internet Protocol IP address.

11. The method according to claim 10, comprising: constructing, by each target service node, a notification packet, and sending the notification packet to the first virtual load balancer, wherein a source IP address of the notification packet is the virtual IP address, a destination IP address of the notification packet is a subnet broadcast address corresponding to the virtual IP address, and the notification packet carries the status of the target backend server running on the target service node on which the detection module is located.

12. The method according to claim 11, wherein namespaces corresponding to different services have different virtual local area network VLAN identifiers, wherein a VLAN identifier of the first namespace and a VLAN identifier of the second namespace are the same.

13. The method according to claim 11, wherein the sending, by each target service node, the notification packet to the first virtual load balancer comprises: sending, by each target service node, the notification packet to the first virtual load balancer through a tunnel between the access node and the target service node on which the detection module is located.

14. The method according to claim 9, wherein when a client accessing the service runs on a target service node, the target service node further comprises a second virtual load balancer, and the method further comprises: sending, by on the target service node, the status of the target backend server on the target service node to the second virtual load balancer.

* * * * *